(12) United States Patent
Chang et al.

(10) Patent No.: US 11,927,444 B2
(45) Date of Patent: Mar. 12, 2024

(54) CHIP-LEVEL RESONANT ACOUSTO-OPTIC COUPLED SOLID STATE WAVE GYROSCOPE

(71) Applicant: NORTHWESTERN POLYTECHNICAL UNIVERSITY, Xi'an (CN)

(72) Inventors: Honglong Chang, Xi'an (CN); Lu Tian, Xi'an (CN); Qiang Shen, Xi'an (CN)

(73) Assignee: NORTHWESTERN POLYTECHNICAL UNIVERSITY, Xi'an (CN)

( * ) Notice: Subject to any disclaimer, the term of this patent is extended or adjusted under 35 U.S.C. 154(b) by 134 days.

(21) Appl. No.: 17/641,490

(22) PCT Filed: Sep. 6, 2021

(86) PCT No.: PCT/CN2021/116699
§ 371 (c)(1),
(2) Date: Mar. 9, 2022

(87) PCT Pub. No.: WO2022/007981
PCT Pub. Date: Jan. 13, 2022

(65) Prior Publication Data
US 2022/0307836 A1    Sep. 29, 2022

(30) Foreign Application Priority Data
Jul. 7, 2020 (CN) .......................... 202010648228.7

(51) Int. Cl.
G01C 19/72 (2006.01)
(52) U.S. Cl.
CPC .................... G01C 19/725 (2013.01)

(58) Field of Classification Search
CPC .............. G01C 19/725; G01C 19/5698; G01C 19/5776; G01H 9/00
See application file for complete search history.

(56) References Cited

U.S. PATENT DOCUMENTS

| 2008/0028855 A1* | 2/2008 | Kano | ................. G01C 19/5698 73/504.12 |
| 2013/0148920 A1* | 6/2013 | Kissa | .................... G02F 1/2255 385/3 |

* cited by examiner

Primary Examiner — Hwa Andrew Lee
(74) Attorney, Agent, or Firm — IPro, PLLC

(57) ABSTRACT

Disclosed is a chip-level resonant acousto-optic coupling solid-state wave gyroscope based on MEMS technology. A surface acoustic progressive wave mode sensitive structure and a micro-ring resonant cavity optical detection structure are combined in the gyroscope. Through acousto-optic effect, mechanical strain of the device crystal caused by wave vibration of a primary surface acoustic wave and a secondary surface acoustic wave caused by Coriolis force is converted into a variation in the refractive index of an optical waveguide etched on the device, so that the optical signal transmitted in the waveguide diffracts, thereby generating frequency modulation. Meanwhile, a micro-ring resonant cavity using the resonance principle peels off the frequency change introduced by the primary surface acoustic wave, and obtains an output signal containing external angular velocity information. Based on the proportional relationship between the detection resolution and the quality factor of the micro-ring resonant cavity, the order of magnitude of the interface detection resolution is improved, and the performance indicators of the gyroscope are simultaneously optimized in terms of improving sensitivity and resolution, and its precision is improved.

3 Claims, 3 Drawing Sheets

CHIP-LEVEL RESONANT ACOUSTO-OPTIC COUPLED SOLID STATE WAVE GYROSCOPE

TECHNICAL FIELD

The disclosure herein relates to the field of micro-sensors, and in particular to a novel chip-level resonance acousto-optic coupled solid-state wave gyroscope based on MEMS technology.

BACKGROUND

As an instrument for measuring angular velocity information of a carrier, gyroscope is an important component part of an inertial navigation system and has important application demands in both the military and civilian fields. Among others, gyroscope precision is one of the key parameters affecting the performance of a navigation system, which plays a decisive role in precise positioning and attitude control. Therefore, development of higher-precision gyroscopes is the core content of the frontier basic research of inertial technology carried out by researchers around the world.

Currently, MEMS solid-state wave gyroscope has become an international research hotspot due to its advantages of small size, wide dynamic range, good impact resistance and stability resulting from its fully symmetrical topological feature structure. However, its precision is significantly weaker than that of fiber-optic gyroscopes, and its performance improvement will be limited by many technical factors such as existing geometric structure topology, precision machining and adjustment, weak signal measurement and control, etc. Therefore, exploring innovative measures that can significantly enhance signal sensitivity such as novel crystal material substrates having piezoelectric/photoelectric/acousto-optical effect, multi-physical field coupling sensitive principles, solid-state wave-sensitive topologies, and optical phase modulator structures, is an inevitable requirement for improving precision of on-chip solid-state wave gyroscopes.

A solid-state acousto-optic gyroscope is a kind of solid-state wave gyroscope, which uses acousto-optic effect to optically detect the signal carrying angular velocity information. As for on-chip solid-state acousto-optic gyroscope based on MEMS technology, only the Carnegie Mellon University has simply integrated an acoustic wave sensitive structure and a light detection structure through standing wave mode in 2018, and initially achieved gyroscope effect. However, structures such as interdigitated transducers, reflectors, et al required for the standing wave mode are complex and tedious, and features such as the geometric constraints of its structural topology and its sensitivity cause that slight structural/process errors will greatly attenuate signal sensitivity. On the other hand, traveling wave mode has features such as a simple structure and geometric relationship, and is suitable for MEMS devices where errors are unavoidable. At present, there is no report in the world on the on-chip integration of chip-level solid-state acousto-optic coupling gyroscopes based on progressive wave mode, and there is no public implementation of on-chip integration of solid-state acousto-optic gyroscopes based on MEMS technology in China. Therefore, the disclosure proposes a novel implementation scheme of a chip-level resonant acousto-optic coupled solid-state wave gyroscope based on MEMS technology for the first time, which has two significant features: first, the on-chip integrated structure of MEMS solid-state acoustic-optical gyroscope based on progressive wave mode is adopted; Second, a full-resonant MEMS acousto-optic gyroscope sensing/detection implementation is adopted. The innovations in these two aspects make it possible for the chip-level resonant acousto-optic coupled solid-state wave gyroscope based on MEMS technology to break through the precision limit of the existing MEMS solid-state wave gyroscope.

SUMMARY

The disclosure provides a novel chip-level resonant acousto-optic coupling solid-state wave gyroscope based on MEMS technology. For the first time, a surface acoustic progressive wave mode sensitive structure and a micro-ring resonant cavity optical detection structure are combined in a gyroscope. Through acousto-optic effect, mechanical strain of the device crystal caused by wave vibration of a primary surface acoustic wave and a secondary surface acoustic wave caused by Coriolis force is converted into a variation in the refractive index of an optical waveguide etched on the device, so that the optical signal transmitted in the waveguide diffracts, thereby generating frequency modulation. Meanwhile, a micro-ring resonant cavity using the resonance principle peels off the frequency change introduced by the primary surface acoustic wave, and obtains an output signal containing external angular velocity information. Based on the proportional relationship between the detection resolution and the quality factor of the micro-ring resonant cavity, the order of magnitude of the interface detection resolution is improved, and the performance indicators of the gyroscope are simultaneously optimized in terms of improving sensitivity and resolution, and its precision is improved.

With reference to FIG. 1 to FIG. 3, the chip-level resonant acousto-optic coupling solid-state wave gyroscope proposed by the disclosure includes a substrate and a gyroscope structure placed on the upper surface of the substrate.

The substrate is capable of realizing piezoelectric effect, photoelectric effect and acousto-optic effect. And in its common form, the substrate includes, from top to bottom: lithium niobate crystal layer-silicon dioxide crystal layer-lithium niobate crystal layer; or lithium niobate crystal layer-silicon dioxide crystal layer-quartz crystal layer; or lithium niobate crystal layer-silicon dioxide crystal layer-silicon crystal layer; etc. The uppermost thin film layer of the substrate needs to have acousto-optic effect converting mechanical strain of the substrate material into a variation in the refractive index of the material.

The gyroscope structure includes three parts: an acoustic sensitive module, an optical detection module and a phase modulation module. The acoustic sensitive module is located in the middle of the gyroscope. The optical detection module is located around the acoustic sensitive module. And the phase modulation module includes two phase modulation modules respectively symmetrical with respect to the acoustic sensitive module, and placed on opposite sides of two optical waveguide branches in the optical detection module.

Further, the acoustic sensitive module may include: an interdigitated transducer composed of first interdigital fingers 1-1 and second interdigital fingers 1-2 formed by sputtering metal on surface of the uppermost thin film layer of the substrate; a first metal electrode layer 2-1 and a second metal electrode layer 2-2 formed by sputtering metal electrode layers uniformly on a side structure of the first interdigital fingers 1-1 and a side structure of the second interdigital fingers 1-2 respectively; and a first array of metallic pillars 3-1 and a second array of metallic pillars 3-2 for sensitive angular velocity formed by secondary sputtering metal on the surface of the uppermost thin film layer of the substrate, the first array of metallic pillars 3-1 consists of metal columns 3-1-0$n$~3-1-$nn$ (n=1, 2, 3, . . . ), and the second array of metallic pillars 3-2 consists of metal columns 3-2-0$n$~3-2-$nn$ (n=1, 2, 3, . . . ).

Further, the optical detection module may include: a first grating coupler 4-1 at a first light source input end and a second grating coupler 4-2 at a second light source input end formed by etching on the surface of the uppermost thin film layer of the substrate; a first grating coupler 5-1, a second grating coupler 5-2, a third grating coupler 5-3 and a fourth grating coupler 5-4 at a signal output end; an input optical waveguide 6 at the first light source input end, an input optical waveguide 7 at the second light source input end, respectively formed by etching on the surface of the uppermost thin film layer of the substrate; a first optical waveguide 12-1, a second optical waveguide 12-2, a third optical waveguide 13-1 and a fourth optical waveguide 13-2 at the signal output end, respectively formed by etching on the surface of the uppermost thin film layer of the substrate; and a first resonant ring 11-1 and a second resonant ring 11-2 formed by etching on the surface of the uppermost thin film layer of the substrate.

Further, the input optical waveguide 6 at the first light source input end is divided into two branches 6-1 and 6-2 with the same structure by a coupler 8-1; the input optical waveguide 7 at the second light source input end is divided into two branches 7-1 and 7-2 with the same structure by a coupler 8-2; the couplers 8-1 and 8-2 may be a Y-shaped branch structure or a multi-mode interference coupling structure used to divide a waveguide into two branches with the same structure, so that the intensities of the optical signal transmitted in the two optical waveguide branches are equal.

Further, the optical waveguide branches 6-1 and 7-1 are connected to each other via a first coupler 9-1 and the first resonant ring 11-1; the optical waveguide branches 6-2 and 7-2 are connected to each other via a second coupler 9-2 and the second resonant ring 11-2; the first optical waveguide 12-1 and the second optical waveguide 12-2 at the signal output end are connected to each other via a third coupler 10-1 and the first resonant ring 11-1; the third optical waveguide 13-1 and the fourth optical waveguide 13-2 at the signal output end are connected to each other via a fourth coupler 10-2 and the second resonant ring 11-2. Here, the first coupler 9-1, the second coupler 9-2, the third coupler 10-1 and the fourth coupler 10-2 may be directional couplers, multimode interference couplers or star couplers, et al, enabling the optical signal in the optical waveguide to be coupled into the resonant ring for transmission, or enabling the optical signal in the resonant ring to be coupled out of the ring into the signal output end for subsequent signal detection.

The phase modulation module may include a first phase modulation electrodes 14-1 and 14-2 on opposite sides of the optical waveguide branch 7-1, and a second phase modulation electrodes 15-1 and 15-2 on opposite sides of the optical waveguide branch 6-2, respectively formed by sputtering metal on the surface of the uppermost thin film layer of the substrate.

Since the overall structure of the disclosure is composed of two parts with symmetrical features, the upper part is taken as an example when explaining its basic working principle, and the specific working process is as follows.

An alternating electric field is generated by applying an external excitation electrical signal to the metal electrode on the interdigitated transducer. The surface of the uppermost thin film layer of the substrate is excited due to the inverse piezoelectric effect to generate a surface acoustic wave for the driving mode of the gyroscope, acting on the first array of metallic pillars 3-1 and the optical waveguide branch 6-1 during propagation along the negative direction of the X-axis. The array of metallic pillars will vibrate under the action of the surface acoustic wave component, i.e. shear wave of the surface acoustic wave along the out-of-plane direction. When the gyroscope has an external angular velocity along the Y-axis, the first array of metallic pillars 3-1 will be affected by the Coriolis force, so that it will fluctuate along the X-axis direction. The fluctuation in this direction and the driving modal acoustic wave fluctuation previously acted on the optical waveguide branch 6-1 act together, generating stress and thus causing periodic strain inside the crystal of the substrate. The mechanical strain is continuously transmitted, resulting in the occurrence of deformation in the optical waveguide branch 6-1, and thus causing change of the refractive index of the optical waveguide branch 6-1. The laser light emitted from the laser light source enters the optical waveguide 6 and the optical waveguide 7 respectively through the grating coupler 4-1 at the first light source input end and the grating coupler 4-2 at the second light source input end, and passes through the Y-shaped connection structure 8-1 and 8-2, and is divided into two beams of equal light intensity. A beam of optical signal 1 in the optical waveguide branch 6-1 is modulated by the change of the refractive index of the waveguide containing the angular velocity and the frequency of the above-mentioned driving mode, and enters into the first micro-ring resonant cavity 11-1 through the first directional coupler 9-1 together with a beam of optical signal 2 in the optical waveguide branch 7-1 that is not modulated. And the two beams of light transmit in clockwise and counterclockwise directions respectively in the micro-ring resonant cavity. After multiple turns of transmission in the micro-ring resonant cavity, the two beams of light are respectively output from the ring through the third directional coupler 10-1. The optical signal 1 enters the first grating coupler 5-1 at the signal output end through the first optical waveguide 12-1 at the signal output end. The optical signal 2 enters the second grating coupler 5-2 at the signal output end through the second optical waveguide 12-2 at the signal output end. Then, the two beams of light in the grating couplers 5-1 and 5-2 are respectively input to the first photodetector and the second photodetector for photoelectric signal conversion. The signal output by the first photodetector and the modulation signal acted on the first phase modulation electrodes 14-1 are collectively fed back to the frequency tuning end of the laser light source after closed-loop control, so that the center frequency of the light source is locked at the resonant frequency of the micro-ring resonant cavity, and the phase of the feedback signal satisfies the resonance condition of the micro-ring resonant cavity. The signal output by the second photodetector is the angular velocity signal and the driving frequency signal of the gyroscope. Similarly, the lower half of the structure is symmetrical to the upper half, and its working process is similar to the above-mentioned control manner. The signal output by the fourth photodetector is the angular velocity signal and the driving frequency signal of the gyroscope, while the angular velocity signal is inverted in phase from the angular velocity signal in the output signal of the second photodetector. Therefore, a frequency discrimination differential circuit is used to eliminate the driving frequency signal with common mode property, resulting in a doubled angular velocity signal, and realizing the extraction and detection of the angular velocity signal.

In order to improve the mechanical sensitivity and interface detection resolution of the gyroscope, and break through the precision limit of existing MEMS solid-state wave gyroscope, the disclosure derives the expression of the precision of the gyroscope. Taking the upper part as an example, there exists the following relationship between the precision of the gyroscope and the mechanical sensitivity and interface detection resolution of the gyroscope:

$$\delta\Omega = \frac{\frac{\sqrt{2Bhf_0^3}}{Q_R\sqrt{P\eta}}}{\frac{Lf_0}{2\pi R}\frac{1}{2}\left(n+\sqrt{\frac{M_2 10^7 P_a}{2LH}}\right)^3 p_{\text{eff}} \frac{-2M_p}{\rho v_R^2 LH} \cdot \varepsilon \sqrt{\frac{P_m Q_D}{\pi f_1 M_r}}}$$

Where, B is the bandwidth; h is Planck constant; $f_0$ is the laser frequency; $Q_R$ is the quality factor of the optical resonant cavity formed by the first ring resonant cavity 11-1; P is the optical power received from the second grating coupler 5-2 during subsequent detection; η is photoelectric conversion efficiency; R is the radius of the first micro-ring resonant cavity 11-1; L is the length of the acousto-optic interaction; H is the depth of surface acoustic wave propagation; n is the intrinsic refractive index of gyroscope waveguide material, that is, the uppermost thin film layer of the substrate; $M_2$ is the acousto-optic figure of merit; $P_a$ is the total acoustic power; $p_{\text{eff}}$ is the effective acousto-optic coefficient in the surface acoustic wave propagation direction; $M_p$ is the total mass of the first array of metallic pillars 3-1; ρ is the density of gyroscope waveguide material, that is, the uppermost thin film layer of the substrate; $v_R$ is the phase velocity of surface acoustic wave; Pm is electrical power; $Q_D$ is the quality factor of the interdigitated transducer composed of the first interdigital fingers 1-1 and the second interdigital fingers 1-2 and the surface acoustic wave resonator composed of the first array of metallic pillars 3-1 in the acoustic sensitive module; $M_r$ is the mass of the interdigitated transducer composed of the first interdigital fingers 1-1 and the second interdigital fingers 1-2; ε is the coefficient of shear wave with respective to longitudinal wave; $f_1$ is the resonant frequency of surface acoustic wave.

It can be seen from the above formula that the precision of the gyroscope δΩ has certain relationships with many parameters, and variations in these parameters will have impacts on the precision. Therefore, analyzing the influence trend of these parameters on the precision of the gyroscope has an important value on the subsequent breakthrough of the precision limit of the existing MEMS solid-state wave gyroscope. Referring to FIG. 4, it is a trend diagram of the quality factor $Q_R$ of the surface acoustic wave resonator, the quality factor $Q_D$ of the optical resonant cavity and the precision of the gyroscope δΩ.

Compared with the prior art, the disclosure can achieve at least the following beneficial effects.

The chip-level resonant acousto-optic coupling solid-state wave gyroscope design of the disclosure is composed of two parts with a symmetrical feature structure as a whole, and can realize structural differential function. The working principle adopts progressive wave mode, and the required structure and geometric relationship are simple, avoiding signal sensitivity attenuation caused by structural/process errors. A resonant optical detection interface based on micro-ring topology structure is designed. That is to say, a grating coupler is used to extract the optical signal in the ring resonant cavity out for subsequent signal processing. The micro-ring resonant cavity has high quality factor characteristic and is proportional to the detection resolution, which greatly improves the interface detection resolution. There is not any floating and movable feature structure in the acoustic sensitive module and the optical detection module, which greatly enhances the impact resistance of the device, and significantly improves the environmental robustness of the MEMS gyroscope. Therefore, the quality factor of the surface acoustic wave resonator can reach more than $10^5$, and the quality factor of the optical resonant cavity can reach more than $10^9$. Compared with the MEMS solid-state wave gyroscope required for vacuum packaging, the quality factor is improved by 3 to 4 orders of magnitude, which greatly improves the signal sensitivity of sensitive structures, while avoiding complex vacuum packaging with unstable leak rate.

To sum up, the disclosure can significantly improve the mechanical sensitivity and interface detection resolution of the gyroscope, and break through the precision limit of the existing MEMS solid-state wave gyroscope.

The technical solutions of the disclosure will be further described in detail below with reference to the accompanying drawings and embodiments.

Among them: 1-1. first interdigital finger; 1-2. second interdigital finger; 2-1. first metal electrode layer; 2-2. second metal electrode layer; 3-1. first array of metallic pillars; 3-2. second array of metallic pillars; 4-1. first grating coupler at first light source input end ; 4-2. second grating coupler at second light source input end; 5-1. first grating coupler at signal input end; 5-2. second grating coupler at signal output end; 5-3. third grating coupler at signal output end; 5-4. fourth grating coupler at signal output end; 6. input optical waveguide at the first light source input end; 7. input optical waveguide at the second light source input end; 8-1. first Y-shaped connection structure; 8-2. second Y-shaped connection structure; 9-1. first directional coupler; 9-2. second directional coupler; 10-1. third directional coupler; 10-2. fourth directional coupler; 11-1. first micro-ring resonant cavity; 11-2. second micro-ring resonant cavity; 12-1. first optical waveguide at signal output end; 12-2. second optical waveguide at signal output end; 13-1. third optical waveguide at output end; 13-2. fourth optical waveguide at output end; 14-1. first phase modulation electrode 1; 14-2. first phase modulation electrode 2; 15-1. second phase modulation electrode 1; 15-2. second phase modulation electrode 2.

DETAILED DESCRIPTION

Figure 1:
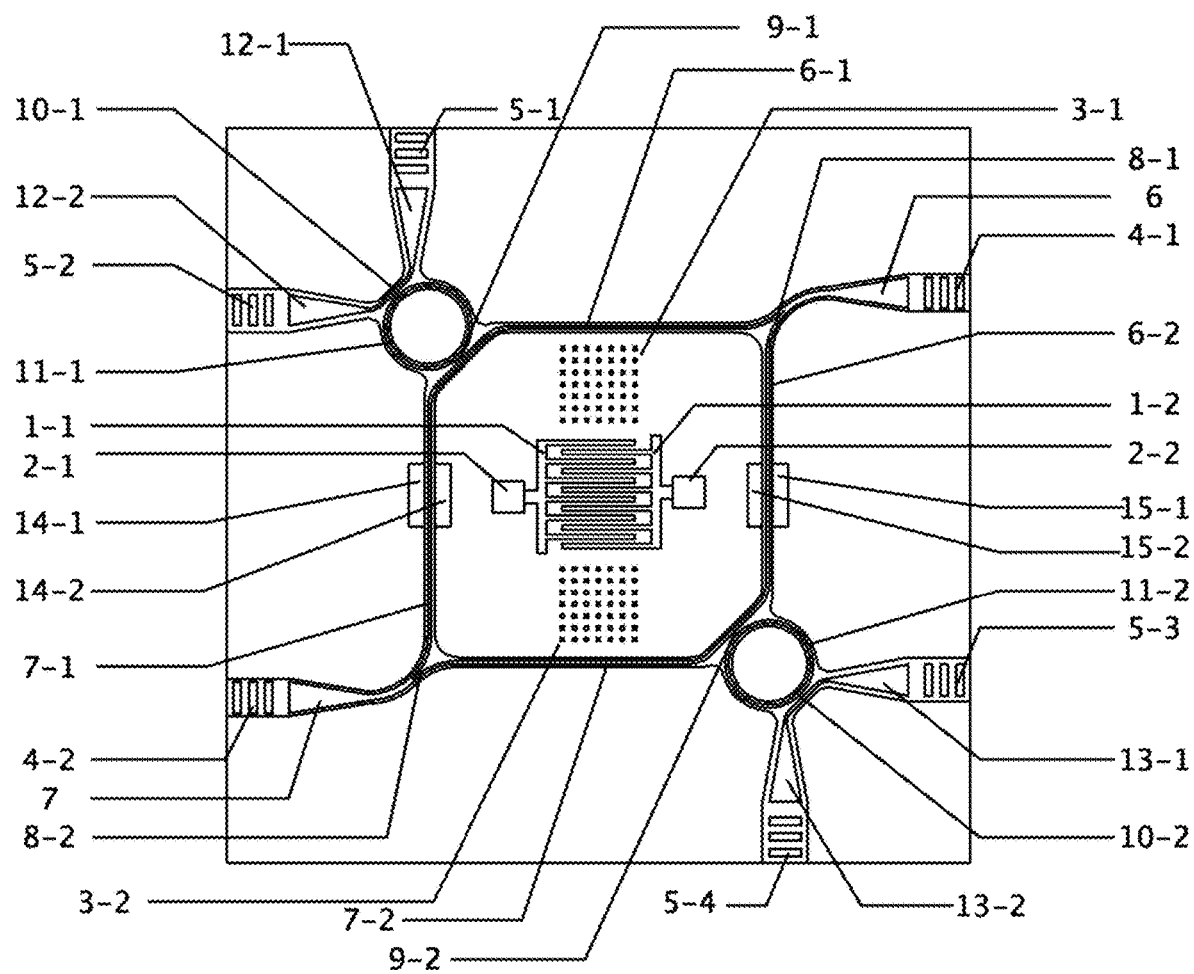
FIG. 1 is a top view of the structure according to the disclosure.
Figure 2:
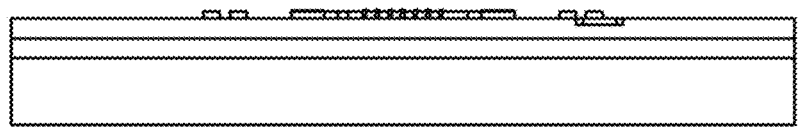
FIG. 2 is a front view of the structure according to the disclosure.
Figure 3:
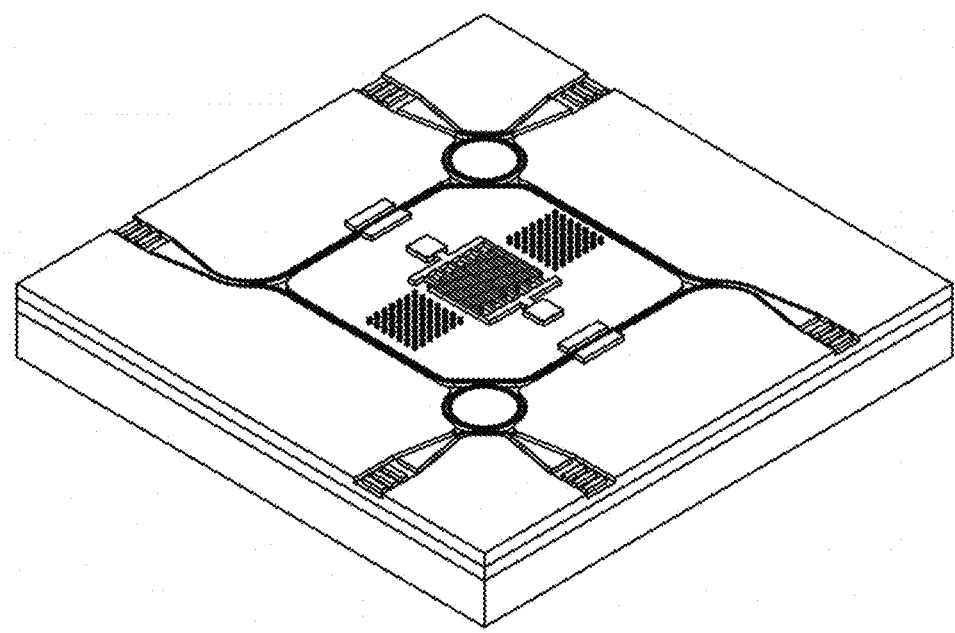
FIG. 3 is a three-dimensional schematic diagram of the structure according to the disclosure.

Referring to FIG. 1 to FIG. 3, the substrate material used in the chip-level resonant acousto-optic coupling solid-state wave gyroscope in an embodiment is lithium niobate crystal-insulator (LNOI), that is, including, from top to bottom, lithium niobate crystal layer-silicon dioxide crystal layer-lithium niobate crystal layer. The gyroscope structure placed on the upper surface of the substrate includes three parts: an acoustic sensitive module, an optical detection module and a phase modulation module. The acoustic sensitive module and the phase modulation module are formed by sputtering metal on the surface of the uppermost thin film layer of the LNOI substrate. And the optical detection module is formed by etching the uppermost thin film layer on the LNOI substrate.

The thickness of the uppermost thin film layer of the LNOI is 500 nm. In the acoustic sensitive module, the length, width and thickness of the interdigitated transducer composed of the first interdigital fingers 1-1 and the second interdigital fingers 1-2 are 390 µm, 380 µm, 500 nm. On each side of the interdigitated transducer, there is a structure with an area of 100 µm×100 µm for sputtering metal electrode layer, on which the first metal electrode layer 2-1 and the second metal electrode layer 2-2 are sputtered with a thickness of 300 nm. The first array of metallic pillars 3-1 and the second array of metallic pillars 3-2 are squares with side lengths of 230 µm. There are 49 metal columns evenly arranged in each of the two arrays of metallic pillars, wherein the first array of metallic pillars 3-1 is composed of metal columns 3-1-01 to 3-1-49, and the second array of metallic pillars 3-2 is composed of metal columns 3-2-01 to 3-2-49. The length, width and thickness of each metal column are 1 µm, 1 µm and 800 nm respectively. In the optical detection module, the grating coupler and the optical waveguide are formed by etching the uppermost thin film layer of the LNOI with an etching depth of 300 nm. The input optical waveguide 6 and the input optical waveguide 7 are respectively divided into two branches with the same structure by using the first Y-shaped connection structure 8-1 and the second Y-shaped connection structure 8-2. The first coupler 9-1 is used as a directional coupler when the waveguide branches 6-1 and 7-1 are connected with the first resonant ring 11-1. Similarly, the second coupler 9-2, the third coupler 10-1 and the fourth coupler 10-2 are respectively used as directional couplers, so that the optical signals in the optical waveguide are coupled into the micro-ring resonant cavity for transmission or coupled out from the resonant ring to the signal output end. The diameter of micro-ring resonant cavity 11-1 and 11-2 is 300 µm. In the phase modulation module, the first phase modulation electrodes 14-1 and 14-2 are located on opposite sides of the optical waveguide branch 7-1, and the second phase modulation electrodes 15-1 and 14-2 are located on opposite sides of the optical waveguide branch 6-2, and their length, width and thickness are 50 µm, 200 µm, and 800 nm respectively.

Figure 4:
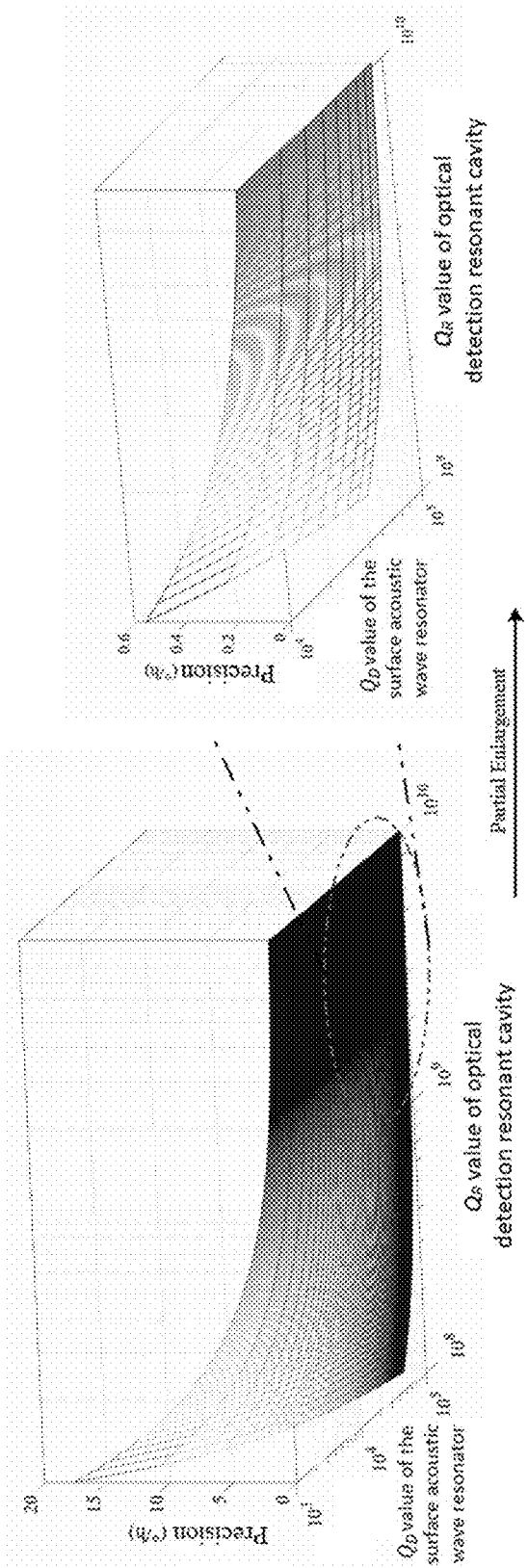
FIG. 4 is the precision limit trend diagram according to the disclosure.

Referring to FIG. 4, it is a trend diagram of the quality factor $Q_D$ of the surface acoustic wave resonator, the quality factor $Q_R$ of the optical resonant cavity and the precision $\delta\Omega$ of the gyroscope. In this embodiment, the influence of other parameters on the precision $\delta\Omega$ of the gyroscope is not considered, and only the influence trend of the quality factor Q value on the precision $\delta\Omega$ of the gyroscope is studied. The value range of the quality factor $Q_D$ of the surface acoustic wave resonator is $10^3$-$10^5$. The value range of the quality factor $Q_R$ of the optical resonant cavity is $10^8$ to $10^{10}$. It can be seen from the figure that with the increase of the quality factor value $Q_D$ of the surface acoustic wave resonator and the quality factor value $Q_R$ of the optical resonant cavity, the limit resolution obtained by the system gets smaller, and the precision of the gyroscope gets higher. It can be seen from the partially enlarged view in FIG. 4 that when the quality factor $Q_D$ of the surface acoustic wave resonator reaches the order of $10^5$ and the quality factor $Q_R$ of the optical resonant cavity reaches the order of $10^{10}$, the theoretical precision of the invented gyroscope can reach 0.0187°/h. It can be known from the analysis that although the precision $\delta\Omega$ of the gyroscope will be affected by many parameters, the theoretical precision of the chip-level resonant acousto-optic coupled solid-state wave gyroscope designed in the disclosure can reach approximately 0.01°/h even when only the influences of the quality factor Q values are considered. Therefore, when other parameters are further optimized, the theoretical precision of the gyroscope is expected to be even higher, indicating that the gyroscope has a potential of high performance.

The above content is only to illustrate the technical idea of the disclosure, and shall not be used to limit the protection scope of the disclosure. Any variation made on the basis of the technical solution according to the technical idea proposed by the disclosure shall all fall within the scope of protection of the claims of the disclosure.

What is claimed is:

1. A chip-level resonant acousto-optic coupled solid state wave gyroscope, comprising a substrate and a gyroscope structure placed on the upper surface of the substrate,
    the substrate includes, from top to bottom:
        a lithium niobate crystal layer, a silicon dioxide crystal layer, a lithium niobate crystal layer; or
        a lithium niobate crystal layer, a silicon dioxide crystal layer, a lithium niobate layer; or
        a lithium niobate crystal layer, a silicon dioxide crystal layer, and a silicon crystal layer;
    the gyroscope structure includes three parts: an acoustic sensitive module, an optical detection module and a phase modulation module,
    the acoustic sensitive module is located in the middle of the gyroscope, and the acoustic sensitive module includes:
        an interdigitated transducer composed of first interdigital fingers (1-1) and second interdigital fingers (1-2) formed by sputtering metal on surface of the uppermost thin film layer of the substrate; and
        a first array of metallic pillars (3-1) and a second array of metallic pillars (3-2) for sensitive angular velocity formed by secondary sputtering metal on the surface of the uppermost thin film layer of the substrate, the first array of metallic pillars (3-1) consists of a plurality of metal columns, and the second array of metallic pillars (3-2) consists of a plurality of metal columns,
    the optical detection module is located around the acoustic sensitive module, and the optical detection module includes:
        a first input grating coupler (4-1) at a first light source input end and a second input grating coupler (4-2) at a second light source input end formed by etching on the surface of the uppermost thin film layer of the substrate;
        a first output grating coupler (5-1), a second output grating coupler (5-2), a third output grating coupler (5-3) and a fourth output grating coupler (5-4) at a signal output end formed by etching on the surface of the uppermost thin film layer of the substrate;
        a first input optical waveguide (6) at the first light source input end, a second input optical waveguide (7) at the second light source input end, respectively formed by etching on the surface of the uppermost thin film layer of the substrate;
        a first optical waveguide (12-1), a second optical waveguide (12-2), a third optical waveguide (13-1) and a fourth optical waveguide (13-2) at the signal output end, respectively formed by etching on the surface of the uppermost thin film layer of the substrate; and a first micro-ring resonant cavity (11-1) and a second micro-ring resonant cavity (11-2) formed by etching on the surface of the uppermost thin film layer of the substrate, wherein, the first input optical waveguide (6) at the first light source input end is divided into a first optical waveguide branch (6-1) and a second optical waveguide branch (6-2) with the same structure by a fifth coupler (8-1);

the second input optical waveguide (7) at the second light source input end is divided into a third optical waveguide branch (7-1) and a fourth optical waveguide branch (7-2) with the same structure by a sixth coupler (8-2);

the first optical waveguide branches (6-1) and the third optical waveguide branch (7-1) are connected to each other via a first coupler (9-1) and the first micro-ring resonant cavity (11-1);

the second optical waveguide branches (6-2) and the fourth optical waveguide branch (7-2) are connected to each other via a second coupler (9-2) and the second micro-ring resonant cavity (11-2);

the phase modulation module includes two phase modulation modules respectively symmetrical with respect to the acoustic sensitive module, and placed on opposite sides of two optical waveguide branches in the optical detection module, the phase modulation module includes:

a first pair of phase modulation electrodes (14-1 and 14-2) on opposite sides of the third optical waveguide branch (7-1), formed by sputtering metal on the surface of the uppermost thin film layer of the substrate; and a second pair of phase modulation electrodes (15-1 and 15-2) on opposite sides of the second optical waveguide branch (6-2), formed by sputtering metal on the surface of the uppermost thin film layer of the substrate.

2. A chip-level resonant acousto-optic coupled solid state wave gyroscope according to claim 1, a first metal electrode layer (2-1) and a second metal electrode layer (2-20 are formed by sputtering metal electrode layers uniformly on a side structure of the first interdigital fingers (1-1) and a side structure of the second interdigital fingers (1-2) respectively.

3. A chip-level resonant acousto-optic coupled solid state wave gyroscope according to claim 1, wherein:

each of the fifth couplers (8-1) and the sixth coupler (8-2) has a Y-shaped branch structure or a multi-mode interference coupling structure used to divide a waveguide into two branches with the same structure, so that the intensities of the optical signal transmitted in the two optical waveguide branches are equal;

the first optical waveguide (12-1) and the second optical waveguide (12-2) at the signal output end are connected to each other via a third coupler (10-1) and the first micro-ring resonant cavity (11-1);

the third optical waveguide (13-1) and the fourth optical waveguide (13-2) at the signal output end are connected to each other via a fourth coupler (10-2) and the second micro-ring resonant cavity (11-2).

* * * * *